(12) United States Patent
Bhatia (10) Patent No.: US 8,856,634 B2
(45) Date of Patent: Oct. 7, 2014

(54) COMPENSATING FOR GAPS IN WORKLOAD MONITORING DATA

(71) Applicant: Microsoft Corporation, Redmond, WA (US)

(72) Inventor: Puneet Bhatia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 157 days.

(21) Appl. No.: 13/674,245

(22) Filed: Nov. 12, 2012

(65) Prior Publication Data

US 2014/0136932 A1    May 15, 2014

(51) Int. Cl.
*G06F 11/00* (2006.01)

(52) U.S. Cl.
CPC .................................... *G06F 11/006* (2013.01)
USPC ............................................. 714/815; 714/39

(58) Field of Classification Search
CPC ... G06F 11/006; G06F 3/0613; G06F 3/0659; G06F 3/0679
USPC ...................... 705/7.26, 7; 711/103; 709/224; 718/104; 714/799, 819, 815, 39
See application file for complete search history.

(56) References Cited

U.S. PATENT DOCUMENTS

| | | | |
|---|---|---|---|
| 6,574,605 B1 * | 6/2003 | Sanders et al. ............... | 705/7.26 |
| 8,234,236 B2 | 7/2012 | Beaty et al. | |
| 2003/0167192 A1 * | 9/2003 | Santos et al. ...................... | 705/7 |
| 2012/0047317 A1 * | 2/2012 | Yoon et al. ..................... | 711/103 |
| 2012/0151052 A1 * | 6/2012 | Jenkins .......................... | 709/224 |
| 2012/0204187 A1 | 8/2012 | Breiter et al. | |
| 2013/0268940 A1 * | 10/2013 | Gmach et al. ................. | 718/104 |

OTHER PUBLICATIONS

Khan, et al., "Workload Characterization and Prediction in the Cloud: A Multiple Time Series Approach", Retrieved at <<http://www.cs.ucsb.edu/~arijitkhan/Papers/multiple_timeseries_prediction.pdf>>, In Proceeding of IEEE/IFIP International Workshop on Cloud Management (Cloudman 2012), Apr. 20, 2012, pp. 14.

(Continued)

*Primary Examiner* — David Ton
(74) *Attorney, Agent, or Firm* — Jim Sfekas; Kate Drakos; Micky Minhas (57) ABSTRACT

Gaps in performance data are corrected for through data transformations and conversion. A raw sequence is transformed by correction logic into an interval sequence by partitioning a performance monitoring period into equal intervals and assigning values based on the raw sequence. Locality sequence entries can indicate whether the interval sequence relies on estimation. The interval sequence is converted into an absence length sequence whose entries indicate null value periods in performance data. Conversion includes generating a presence sequence from the interval sequence, and deriving the absence length sequence from the presence sequence, by using a set-based algorithm or other mechanism. Excessive absence length values support treating intervals as downtime for the machine. Correction logic may include a stored procedure residing in a database, for example, which produces the absence length sequence without using a procedural language.

20 Claims, 2 Drawing Sheets

(56) References Cited

OTHER PUBLICATIONS

Das, et al., "Autonomic Multi-Agent Management of Power and Performance in Data Centers", Retrieved at <<http://lass.cs.umass.edu/~shenoy/courses/fall09/691gc/papers/Kephart-2008-2-aamas08.pdf>>, In Proceedings of the 7th international joint conference on Autonomous agents and multiagent systems: industrial track, May 16, 2008, pp. 8.

Quiroz, et al., "Towards Autonomic Workload Provisioning for Enterprise Grids and Clouds", Retrieved at <<http://www.cse.unl.edu/~ylu/csce896/papers/auto-provisioning-clouds.pdf>>, in 10th IEEE/ACM International Conference on Grid Computing, 2009, Oct. 15, 2009, p. 8.

Elnaffar, et al., "Characterizing Computer Systems' Workloads", Retrieved at <<http://www.google.co.in/url?sa=t&rct=j&q=%22Characterizing+Computer+Systems%E2%80%99+Workloads%22&source=web&cd=2&cad=rja&ved=0CCkQFjAB&url=http%3A%2F%2Fciteseerx.ist.psu.edu%2Fviewdoc%2Fdownload%3Fdoi%3D10.1.1.13.5642%26rep%3Drep1%26type%3Dpdf&ei=w7RSUIyxKYbirQflpYCwDg&usg=AFQjCNEyX2iBDlaunmoYn23ICTpjPk9N_A>>, In the Technical Report, Dec. 2002.

"Cisco Introduction to End to End Desktop Virtualization", Retrieved at <<http://www.cisco.com/en/US/docs/solutions/Enterprise/Data_Center/VXI/VXI_PRIMER.pdf>>, Sep. 14, 2012, p. 44.

Polly, Rob., "Planning for Desktop Virtualization using the MAP Toolkit 7.0 (Part 2 of 4)", Retrieved at <<http://blogs.technet.com/b/mapblog/archive/2012/06/08/desktop-virtualization-part-2-of-4.aspx>>, Jun. 8, 2012, p. 4.

"Microsoft Virtual Desktop Infrastructure (VDI)", Retrieved at <<http://www.microsoft.com/en-us/windows/enterprise/products-and-technologies/virtualization/vdi.aspx>>, copyright date 2012, p. 2.

\* cited by examiner

COMPENSATING FOR GAPS IN WORKLOAD MONITORING DATA

BACKGROUND

Computing machinery can be monitored automatically (by other computing machinery) to obtain information such as computational throughput, resource requests and actual resource usage over time, uptime/downtime, attempted or actual security breaches, malware status, physical location, upgrade deployment status, user credentials, and other characteristics. Monitoring capabilities may be implemented using agents or other software on monitored machines; such software may then report information in real time, or report intermittently, or report when requested, but in any case provides raw data to the monitoring entity. Data obtained from a monitored machine is considered "raw" for present purposes even if it has been processed somewhat on the monitored machine before being reported.

The raw data gathered from monitored machines may be processed into a form suitable to the kind of monitoring being done and to the goals of that monitoring. For example, when a goal of monitoring is to understand more about which users make use of which monitored machines, a list of users who logged into a machine may be created from the raw data, or a list of the machines that a given user logged into may be created. Other kinds of monitoring may, of course, have different goals and may gather and utilize different kinds of data.

SUMMARY

In some situations, creating a client workload model for server placement based on smoothened (interpolated) performance time series data gathered from a disparate sample set of monitored client machines faces the problem of incorrectly ignoring actual downtimes. Some embodiments described herein provide a robust and easily adjustable approach to accounting for large gaps in time series data, using computational techniques implemented by a processor operating on data of a computer-readable memory to obtain specified functionality.

Before turning to details of different embodiments, one point common to all embodiments is worth noting. One of skill will recognize that computational machines are involved in all embodiments described herein, as a source of the raw data. Moreover, for embodiments having at least fifty monitored machines, a computational machine will be acknowledged by one of skill as the only practical way to process that raw data sufficiently quickly and accurately to base business decisions on the processing results in real-world scenarios for purposes such as resource allocation or resource consolidation.

In some embodiments, a desire to compensate for one or more gaps in workload monitoring data arises after obtaining in a computer-readable memory workload monitoring data, which includes raw performance data having values for at least one monitored machine and in various cases having values for at least five, at least ten, at least fifty, at least one hundred, at least five hundred, or at least one thousand monitored machines, in respective embodiments. The raw performance data values (denoted as a "raw sequence" herein) are spaced apart at different points in time, with at least one gap. That is, at least one pair of adjacent raw performance data values are spaced apart at a larger spacing than at least one other pair of adjacent raw performance data values, and no raw performance data value is provided for at least one monitored machine within that larger spacing.

Some embodiments computationally transform at least a portion of the raw sequence into interval performance data, by partitioning a performance monitoring period into equal intervals and assigning null and non-null values to the intervals based on raw sequence values within the intervals. The monitoring period and the interval size can be user-defined or hard-coded, for instance. The interval performance data is denoted as an "interval sequence" herein. Some embodiments replace a null value in the interval sequence by a non-null value which is a function of neighboring non-null values, e.g., a mean, a median, or another interpolation of neighboring non-null values. Some embodiments populate a locality sequence with entries that indicate whether one or more corresponding entries of the interval sequence rely on estimation rather than being directly observed values.

Some embodiments computationally convert at least a portion of the interval sequence into an absence length sequence. The absence length sequence facilitates compensation for gap(s) in the workload monitoring data, in that entries in the absence length sequence indicate a relative duration of null value periods in transformed raw performance data. The interval sequence and the absence length sequence are stored in a table in a data store or in another computer memory store, such that for each time interval there is a corresponding performance data point and absence length value.

Conversion of an interval sequence into an absence length sequence may be accomplished in part by computationally generating an interval performance data presence sequence from the interval sequence. The generated sequence is denoted as a "presence sequence" herein. Each interval sequence null value corresponds to a zero in the presence sequence and each interval sequence non-null value corresponds to a one in the presence sequence. Then the embodiment computationally derives the absence length sequence from the presence sequence.

Some embodiments derive the absence length sequence from the presence sequence by using an algorithm consistent with the following: let T denote an ordered set of time intervals of the form [1,N] where N is a maximum time interval value, let Tprime denote an ordered subset of T such that for any time interval Ti in Tprime the corresponding presence sequence value is 0, and for a monitored item select Tprime, generate an ordered set S such that any element Si in S satisfies the relation R->Si=Ti−indexof(Ti), with Ti permitted to have a many-to-one relationship with S, and generate a time-series absence sequence such that at any time interval Tk in the sequence when Tk is not in TPrime the absence sequence value is 0 and when Tk is in TPrime the absence sequence value is F(Sk) where F(Sk) is the number of time intervals in TPrime that evaluate to the value Sk in S, where Sk=Tk−IndexOf(Tk).

Some embodiments derive the absence length sequence from the presence sequence by using an algorithm with the following steps. Step 1: divide a collection period into fixed length time intervals with at least one observed data point within each interval, and number the time intervals. Step 2: for each time interval with at least one direct observation, store a zero in the corresponding absence length field at that time interval, otherwise store a non-zero value. Step 3: select all the data points that have initial absence length not zero, ordered by time interval along with their corresponding row numbers which are an increasing consecutive number sequence. Step 4: subtract the row number for each data point selected in step 3 from its corresponding time interval and assign to a variable, denoted a grouptag. Step 5: group the data points in step 4 by their grouptag. Step 6: select the count for each group as the absence length value for each data point that is a member of that group. Step 7: update the absence length values.

Some embodiments get into a computer memory a maximum absence length value (denoted here as MAX-A) from a user, a configuration file, or hard-coded definition, and then computationally create a transformed version of the original interval sequence for a target machine using MAX-A. For every time interval where the corresponding absence length value is less than MAX-A, the performance data point for that interval (whether interpolated or not) is used as-is; for any absence length value above MAX-A the value zero is selected as the performance data point, thereby treating the time interval as downtime for the machine.

From an architectural perspective, some embodiments for monitoring at least N machines (with N=1, 5, 10, 50, 100, 500, or 1000, depending on the embodiment) include a logical processor as well as a memory in operable communication with the logical processor, to perform monitoring functions. A raw performance time series data in the memory has values for the at least N monitored machine(s). For instance, the raw performance time series data values may represent performance of monitored machines which are desktop computers in an enterprise, and/or represent client computer performance of monitored machines (desktops, laptops, tablets, etc.) which are intermittently or continually clients in an entity-utilized client-server network for a commercial enterprise, educational institution, government agency, or another entity. The raw performance time series data values ("raw sequence") are spaced apart at different points in time. The raw sequence has at least one gap, namely, at least one pair of adjacent raw performance time series data values are spaced apart at a larger spacing than at least one other pair of adjacent raw performance time series data values and no raw performance time series data value is provided for at least M monitored machine(s) within that larger spacing.

A correction module in some embodiments has correction logic which interacts with the processor and memory to correct at least one gap in the raw performance time series data for use in workload monitoring, more accurately and rapidly than possible with mere mental steps or any other approach that relies on a human brain to do the necessary arithmetic, lookup, and other calculations. The correction logic includes hardware and software operating together to provide the specified data processing functionality.

In particular, in some embodiments the correction logic transforms at least a portion of the raw sequence into an interval sequence by partitioning a performance monitoring period into equal intervals and assigning null and non-null values to the intervals based on raw sequence values within the intervals. The correction logic converts at least a portion of the interval sequence into an absence length sequence, thus correcting for at least one gap in the workload monitoring data by indicating a relative duration of null value periods in transformed raw performance data.

In some embodiments, the correction logic includes software residing in the memory. Correction logic may include a stored procedure residing in a database, for example. Upon execution by the processor, the software generates an interval performance data presence sequence ("presence sequence") from the interval sequence. Each interval sequence null value corresponds to a zero in the presence sequence and each interval sequence non-null value corresponds to a one in the presence sequence (other values may also be used, e.g., one alternative uses a one to indicate a null value and zero to indicate a non-null value). The correction logic software derives the absence length sequence from the presence sequence. In some embodiments, the correction logic produces the absence length sequence without using a procedural language; in some, it produces the absence length sequence without using iterative constructs; and in some embodiments, it does not use either.

In some embodiments, the correction logic aggregates performance time series data values from multiple monitored machines. In some cases, some correction logic software aggregates performance time series data values from multiple monitored machines while treating as zero interpolated values for data points whose absence length sequence value is greater than a predetermined positive maximum absence length value. In general, the correction logic frees human users from use as mere calculators, permitting them to instead perform tasks not within the reach of computing machines, such as making business decisions, maintaining personal and professional relationships, and conceiving innovations.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Client workload models are often based on performance time series data gathered from a monitored client machines. Similarly, server workload models are often based on data gathered from monitored server machines. But large gaps in the time series raw data can lead some workload models to incorrectly ignore actual client machine downtimes. Some embodiments described herein make adjustments to account for large gaps in the raw time series data, thereby allowing models to work more accurately by giving them corrected data as inputs.

In some embodiments, raw performance data points gathered from observing monitored machine behavior over a period of time is aggregated into discrete equal-length time intervals. These intervals span the total observed period, and are used to produce a time series, with interpolated values injected for time intervals where no direct observations were able to be made due to a machine not being reachable. A function is applied over this time series using an efficient set-based algorithm that generates another time series, where the value of each data point equals the contiguous length of the interpolation at that time interval in the original time series. Workload models are then created by aggregating performance time series data from multiple monitored machines while ignoring (treating as zero) interpolated values for data points whose unreachable time length is greater than a certain predetermined adjustable value.

Some embodiments described herein may be viewed in a broader context. For instance, concepts such as algorithms, interpolation, maximums, partitioning, performance monitoring, and transformation may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving algorithms, interpolation, maximums, partitioning, performance monitoring, or transformation are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent to a wide range of attentive readers. For instance, some embodiments address technical problems such as correctly treating machine downtime and adapting to gaps in performance data. Also, some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein transform, convert, generate, derive, and/or replace data in particular ways described herein to achieve particular effects. Moreover, technical advantages of some embodiments include improved usability of raw performance data and increased reliability of computing resource allocation models that are based on such data.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include mobile robots and SEGWAY® wheeled personal mobility devices (mark of Segway, Inc.). These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software. Likewise, the technical effect of making raw performance data usable for resource modeling despite downtime gaps is provided by technical components such as a correction module described herein.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as assigning, converting, corresponding, creating, deriving, executing, generating, getting, indicating, interacting, interpolating, monitoring (observing), obtaining, operating, partitioning, populating, producing, providing, replacing, representing, storing, transforming, using (or assigns, assigned, converts, converted, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. A memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

Figure 1:
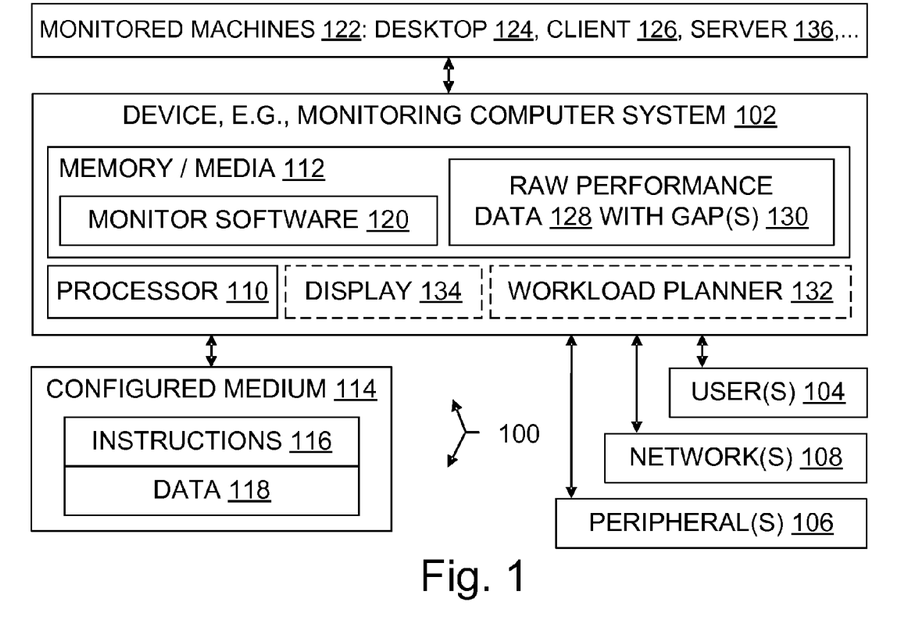
FIG. 1 is a block diagram illustrating a monitoring computer system having at least one processor and at least one memory which interact with one another under the control of software for monitoring one or more other machines, and other items in an operating environment which may be present on multiple network nodes, and also illustrating configured storage medium (as opposed to a mere signal) embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a monitored Microsoft XBOX Live® server (mark of Microsoft Corporation) or other monitored machine. The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of physical durable storage media (as opposed to merely a propagated signal). In particular, a configured medium 114 such as a CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation of logic, the technical functionality of logic described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, a monitoring computer system 102 includes hardware (processor 110, memory 112) and software 120 for monitoring one or more other machines 122 such as desktops 124, clients 126, servers 136, and so on. A desktop 124 may also be a client 126 on a network 108, or not (e.g., desktops may be connected intermittently to the network), and a client 126 may also be a desktop 124 (or some other device, e.g., a tablet or a laptop). The monitoring system uses familiar tools and techniques such as monitoring agents to obtain raw performance data 128 which reflects performance (e.g., throughput, uptime, resource requests, resource usage) of the monitored machines 122. The raw performance data 128 has gaps 130, due to factors such as network connections or individual monitored machines being down.

A workload planner 132, such as logic for allocating tasks among monitored machines in a distributed system, or logic for creating, releasing, and/or moving monitored virtual machines 122 among a set of underlying monitored actual machines 122, may also be present. The software 120, raw data 128, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation.

In addition to processors 110 (CPUs, ALUs, FPUs, and/or GPUs), memory/storage media 112, display(s) 134, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
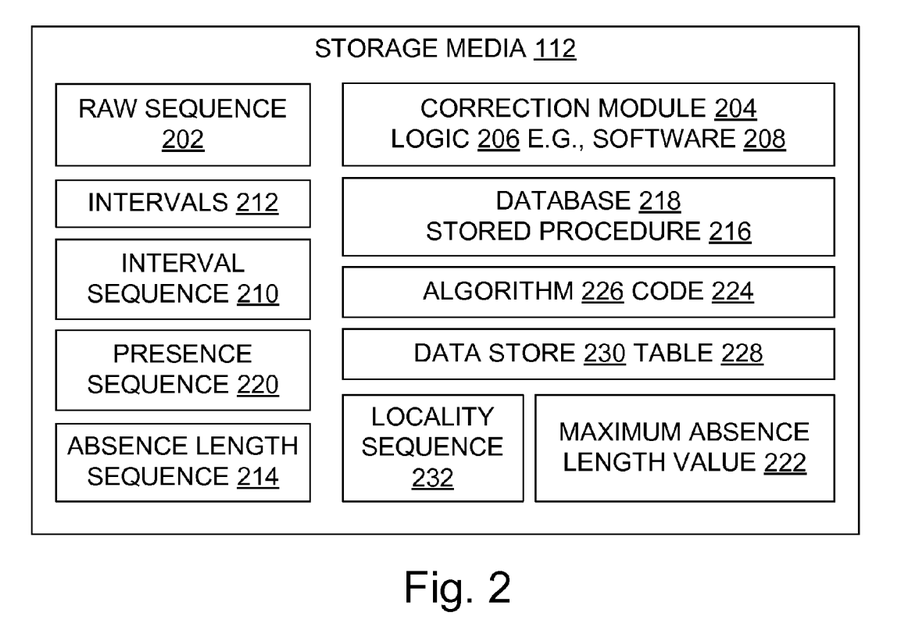
FIG. 2 is a block diagram illustrating aspects of compensation for gaps in workload monitoring data in an example architecture.

FIG. 2 illustrates aspects of an architecture which is suitable for use with some embodiments. Some embodiments for monitoring at least N machines 122 (with N=1, 5, 10, 50, 100, 500, or 1000, depending on the embodiment) include a logical processor 110 as well as a computer memory 112 in operable communication with the logical processor, to perform monitoring functions. A raw performance time series data 128 in the memory has values for the at least N monitored machine(s). For instance, the raw performance time series data values may represent performance of monitored machines 122 which are servers 136, and/or desktop computers 124 in an enterprise, and/or clients 126. As to clients in particular, data 128 values may represent client computer 126 performance of monitored machines (desktops, laptops, tablets, etc.) which are intermittently or continually clients in an entity-utilized client-server network 108 for a commercial enterprise, educational institution, government agency, or another entity.

The raw performance time series data 128 values of interest (denoted here a "raw sequence" 202) are spaced apart at different points in time. The raw sequence 202 has at least one gap 130, namely, at least one pair of adjacent raw performance time series data values are spaced apart at a larger spacing than at least one other pair of adjacent raw performance time series data values and no raw performance time series data value is provided for at least M monitored machine(s) 122 within that larger spacing, where 0<M<=N.

In some situations, any given subset of three or more raw data points in the raw sequence may be equally spaced or unequally spaced in time. Thus, raw data points may be randomly spaced from one another, or evenly spaced, or intermittent (evenly spaced but with some missing), or any mixture of those spacings. This spacing reflects gaps in the collection of raw performance data points. An implementation could try to sample every N minutes, for example, but that's only one of many possible approaches.

A correction module 204 in some embodiments has correction logic 206 which interacts with the processor 110 and memory 112 to correct at least one gap in the raw performance time series data for use in workload monitoring. The correction module 204 may also contain other logic, such as authentication logic, logic for maintaining and managing a history, and user interface logic. The correction logic 206 operates more accurately and rapidly than possible with mere mental steps or any other approach that relies on a human brain to do the necessary arithmetic, lookup, and other calculations. The correction logic 206 includes hardware 110, 112 and software 208 operating together to provide the specified data processing functionality, e.g., for transforming and converting data.

In particular, in some embodiments the correction logic 206 transforms at least a portion of the raw sequence 202 into an interval sequence 210 by partitioning a performance monitoring period into equal intervals 212 and assigning null and non-null values to the intervals 212 based on raw sequence values 128 within the intervals 212. The correction logic 206 also converts at least a portion of the interval sequence 210 into an absence length sequence 214, thus correcting for at least one gap 130 in the workload monitoring data by indicating a relative duration of null value periods in transformed raw performance data.

In some embodiments, the correction logic 206 includes software 208 residing in the memory 112. Correction logic 206 may include a stored procedure 216 residing in a database 218, for example, as part of its software 208. Upon execution by the processor 110, the software 208 (stored procedure and/or otherwise) generates an interval performance data presence sequence ("presence sequence" 220) from the interval sequence 210. In one embodiment, each interval sequence null value corresponds to a zero in the presence sequence 220 and each interval sequence non-null value corresponds to a one in the presence sequence; in other embodiments, non-nulls may correspond instead to zero, for example.

In some embodiments, the correction logic software 208 derives the absence length sequence 214 from the presence sequence 220; in others the absence length sequence 214 comes directly from the interval sequence 210 without an explicit intervening presence sequence 220. In some embodiments, the correction logic 206 produces the absence length sequence without using a procedural language, e.g., by using SQL code within a database 218. In some embodiments, it produces the absence length sequence without using iterative constructs; and in some embodiments, it does not use either a procedural language or an iterative construct. The absence length sequence 214 may be computationally derived from the presence sequence using code 224 that implements an efficient set-based algorithm 226 that is described elsewhere herein in connection with a deriving step.

One or more of the various sequences (raw sequence 202, interval sequence 210, absence length sequence 214, presence sequence 220, and a locality sequence 232) may be stored in a table 228 in a database or other data store 230. The locality sequence 232 distinguishes levels of estimation, e.g., indicating whether a value is a raw directly observed value, or an estimate based on an hourly, daily, or all-time average.

In some embodiments, the correction logic 206 aggregates performance time series data values from multiple monitored machines 122. In some cases, some correction logic software 208 aggregates performance time series data values from multiple monitored machines 122 while treating as zero interpolated values for data points whose absence length sequence value is greater than a predetermined non-negative maximum absence length value 222.

In general, the correction logic 206 frees human users from use as mere calculators. People are thus permitted to instead perform tasks not within the reach of these or other computing machines, such as making business decisions, maintaining personal and professional relationships with other people, and conceiving innovations.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, multiple monitored devices/systems 102, 122 may be connected to a networked cloud, sequences 202, 210, 214, 220, 226 may be stored on yet other devices 102 within the cloud, and the workload planner 132 may configure the display on yet other cloud device(s)/system(s) 102.

Processes

Figure 3:
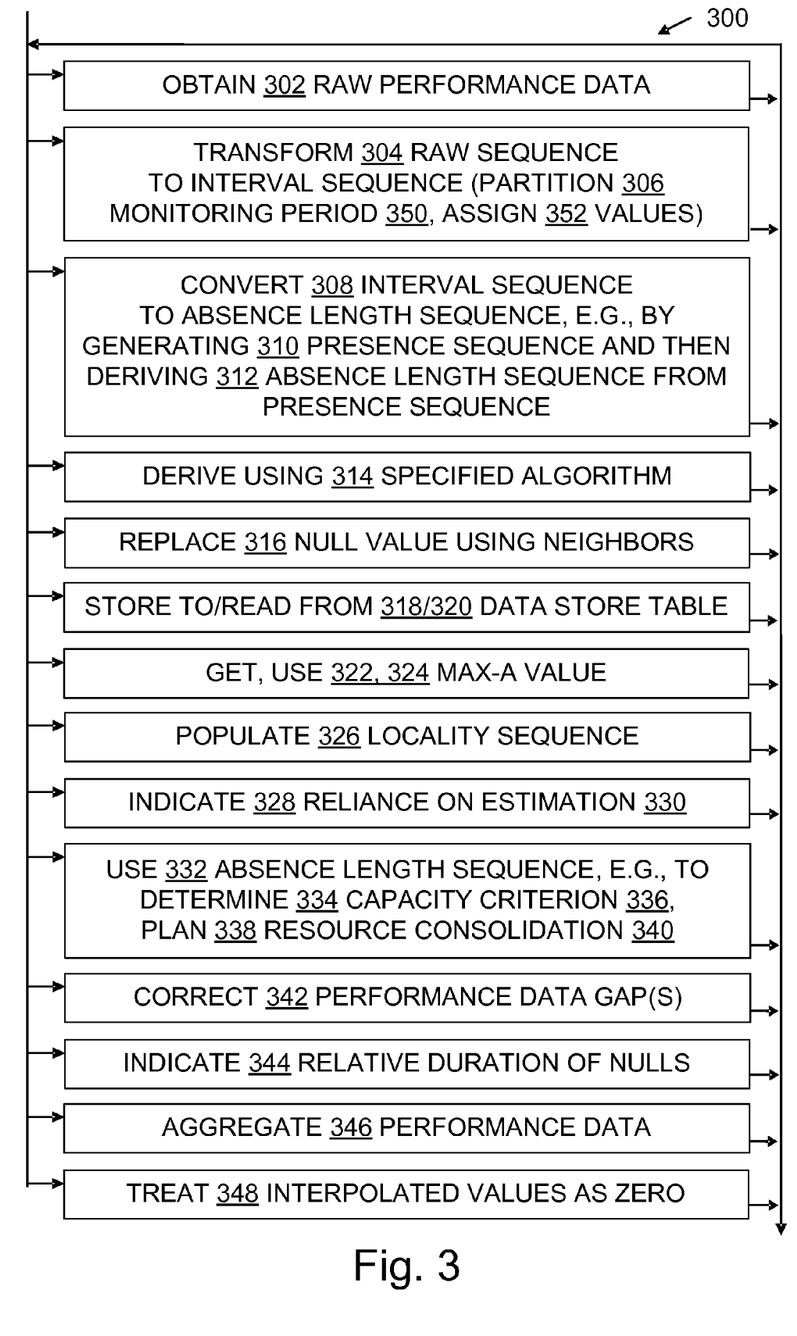
FIG. 3 is a flow chart illustrating steps of some process and configured storage medium embodiments.

FIG. 3 illustrates some process embodiments in a flowchart 300. Technical processes shown in the Figures or otherwise disclosed may be performed in some embodiments automatically, e.g., by a monitoring system under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments correct 342 for one or more gaps in workload monitoring data after obtaining 302 in a computer-readable memory workload monitoring data by transforming 304 and converting 308 raw performance data. The raw performance data has values for at least one monitored machine and in various cases has aggregated 346 values for at least five, at least ten, at least fifty, at least one hundred, at least five hundred, or at least one thousand monitored machines, in respective embodiments. The raw performance data values (denoted as a "raw sequence" 202 herein) are spaced apart at different points in time, with at least one gap 130: at least one pair of adjacent raw performance data values are spaced apart at a larger spacing than at least one other pair of adjacent raw performance data values, and no raw performance data value is provided for at least one monitored machine within that larger spacing.

Some embodiments computationally transform 304 at least a portion of the raw sequence into interval performance data, by partitioning 306 a performance monitoring period 350 into equal intervals 212 and assigning 352 null and non-null values to the intervals 212 based on raw sequence values within the intervals. The monitoring period 350 and the interval 212 size can be user-defined or hard-coded, for instance. The interval performance data is denoted as an "interval sequence" 210 herein.

Some embodiments replace 316 a null value in the interval sequence 210 by a non-null value which is a function of neighboring non-null values, e.g., a mean, a median, or another interpolation of neighboring non-null values. Some embodiments populate 326 a locality sequence 232 with entries that indicate 328 whether one or more corresponding entries of the interval sequence rely on estimation 330 rather than being directly observed values.

Some embodiments computationally convert 308 at least a portion of the interval sequence 210 into an absence length sequence 214. The absence length sequence facilitates compensation for gap(s) in the workload monitoring data, in that entries in the absence length sequence indicate 344 a relative duration of null value periods in transformed raw performance data. The interval sequence and the absence length sequence can be stored 318 in and read 320 from a table 228 in a data store 230 or in another computer memory store. In some embodiments, for each time interval 212 there is a corresponding performance data point and absence length value.

Conversion 308 of an interval sequence into an absence length sequence may be accomplished in part by computationally generating 310 an interval performance data presence sequence from the interval sequence. The generated sequence is denoted as a "presence sequence" 220 herein. Each interval sequence null value corresponds (for example) to a zero in the presence sequence and each interval sequence non-null value corresponds (for example) to a one in the presence sequence. Then the embodiment computationally derives 312 the absence length sequence from the presence sequence. Some embodiments use zero and null (a.k.a. NULL) interchangeably, while others make a distinction between a zero value and a null value.

Some embodiments derive 312 the absence length sequence from the presence sequence by using 314 an algorithm 226 consistent with the following: let T denote an ordered set of time intervals of the form [1,N] where N is a maximum time interval value, let Tprime denote an ordered subset of T such that for any time interval $T_i$ in Tprime the corresponding presence sequence value is 0, and for a monitored item select Tprime, generate an ordered set S such that any element $S_i$ in S satisfies the relation R->$S_i$=$T_i$−indexof($T_i$), with $T_i$ permitted to have a many-to-one relationship with S, and generate a time-series absence sequence such that at any time interval Tk in the sequence when Tk is not in TPrime the absence sequence value is 0 and when Tk is in TPrime the absence sequence value is F(Sk) where F(Sk) is the number of time intervals in TPrime that evaluate to the value Sk in S, where Sk=Tk−IndexOf(Tk).

Some embodiments get 322 into a computer memory 112 a maximum absence length value (denoted here as MAX-A) 222 from a user 104, from a configuration file, or from hard-coded definition, or computed at runtime based on the collected data. Then these embodiments computationally create a transformed version of the original interval sequence for a target machine using 324 MAX-A. For every time interval where the corresponding absence length value is less than MAX-A, the performance data point for that interval (whether interpolated or not) is used as-is; for any absence length value above MAX-A the value zero (for example) is selected as the performance data point, thereby treating the time interval as downtime for the machine. Some embodiments treat 348 interpolated values as zero.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as a presence sequence 220, absence length sequence 214, or correction software 208, in the form of data 118 and instructions 116, read from a removable medium 114 and/or another source such as a network connection, to form a configured medium. The configured medium 112 is capable of causing a computer system to perform technical process steps to compensate for gaps in raw performance data as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Although client machines 126 are an example of machines suitable for being monitored to obtain performance data 128, other embodiments are also possible. In particular, some embodiments support a monitoring system that can treat workload profiles for servers 136 differently than workload profiles for clients 126 in an information technology environment 100. Some examples of servers 136 include machines configured for providing services as a Web Server, an Application Server, and so on. Such servers typically run a server-class operating systems such as Microsoft® Windows Server® 2008 R2 operating system (marks of Microsoft Corporation) or a UNIX® variant operating system, of which there are many (mark of The Open Group). Microsoft's MAP toolkit allows placement and/or consolidation analysis for both client and server machines that are monitored. In particular, an administrator 104 could take the server workload profile as-is but for a client use a MAX-A of 6, for instance.

Microsoft's Virtual Desktop Infrastructure (VDI) allows users to seamlessly access their rich and full fidelity operating system environment running in a datacenter, from any device 102. Like some other virtualization technologies, VDI presents a challenge to familiar time series interpolation usage because desktop computers, unlike servers, tend to have much lower uptimes. In a 24 hour cycle, it would not be surprising for VDI or another virtualization technology to have as much as 16 hours in which no performance data is being collected because a monitored machine powered down outside the normal work hours. With some familiar approaches, time intervals in that 16 hour period will be filled with the average for the 8 hours of the day when data was collected, which is generally incorrect. Servers have typically larger uptimes and so intermittent gaps in data are expected to be smaller, making interpolation more valuable. However, for desktops one may consider time intervals in the 16-hour downtime period to have zero as the value for performance metrics. Furthermore, treating all missing data for time intervals as zeroes may not be desired, even in the VDI case. For example, a user 104 may have restarted their machine or applied a patch which causes a reboot.

One approach adds a database column for each metric that is computed for a time interval. The added locality column (a.k.a. locality sequence 232) is populated concurrently with the time series computation. Locality indicates the extent to which estimation is relied on. In one embodiment, the locality sequence entries each have one of the following values 0—the metric was directly calculated from direct observations, i.e. not estimated 1—the metric was estimated from averages for the hour 2—the metric was estimated from averages for the day 3—the metric was estimated from all-time average During placement analysis, or other resource allocation/consolidation analysis, when the time series is selected from the data store 230 the placement algorithm filters the data based on locality. For example, for VDI one might say that any metric data based on an estimation from averages of more than an hour (locality=1) should be treated as a zero. This gives one the ability to account for short gaps in data while treating longer ones as zeroes (e.g., three hours of missing data between shifts at a call center). One may decide that this approach is overly sensitive around the edges of time intervals. For example if the last successful collection of data happened at 5:01 pm after which the computer was shutdown, one could still end up using the average for the hour (the value collected at 5 PM) for all time intervals in that hour. Likewise, if there is only one collection for the day, models based on this approach could end up using the one value for all time intervals instead of using zeroes.

Another approach adds a column for each metric tracking the absence length, which is computed after the time series computation. To illustrate a meaning that can be ascribed to the absence length value, consider the time series as being indexed by a bit string, e.g., presence sequence:

1 1 0 0 0 1 0 1 0 0 0 0 1 1

Each bit in this presence string indicates whether the value at that time interval was estimated (0) or calculated directly from observation (1). Absence length at a particular time interval is the length of the substring of 0's the time interval is within, namely, the number of consecutive time intervals where no direct observations were made (note that one could record the locality as well):

1 1 0 0 0 1 0 1 0 0 0 0 1 1 (presence sequence)
0 0 3 3 3 0 1 0 4 4 4 4 0 0 (corresponding absence length sequence)

In some embodiments, small absence length values will typically result from less than one hour of missing data. Longer ones will indicate prolonged gaps which can be inferred to be, as is often the case for VDI, downtimes for the machines. This provides a robust approach which allows an embodiment to quantify gaps and characterize the gaps more accurately, e.g., gaps could be due to a repeated event such as people logging off after work, or could be intermittent. When using the time series for placement analysis purposes, one could specify that any observation with absence length of 96 or more (6 time intervals/hour×16 hours) should be treated as a zero, allowing planning to exclude non-working hours for a typical task worker. This MAX-A value can also be user driven. Some embodiments use this absence length to determine what values to use to fill gaps during interpolation.

Some embodiments store 318 the interval sequence along with the absence length sequence in a table in a data store such that for each time interval there is a corresponding performance data point and an absence length value. To develop the performance profile for the machine at run time, a maximum absence length value 222 is chosen (call this value MAX-A) which could be static, based on user input or by learning from the set of interval sequences available for similar machines in the database. Then MAX-A is used to create a transformed version of the original interval sequence for a target machine such that for every time interval where the corresponding absence length value is less than MAX-A the performance data point for that interval (whether interpolated or not) is used as-is and for any absence length value above MAX-A the value zero is selected as the performance data point therefore treating the time interval as downtime for the machine. This transformed performance profile is then used 332 by planner(s) 132 for tasks such as determining 334 capacity criteria 336, determining 334 a capacity plan 338, and determining 334 a suitable consolidation 340 of information technology assets.

Some embodiments obtain 302 a sequence of raw performance data points for a monitored computer system; this is the raw sequence 202. The monitored computer system 122 may be an individual desktop machine, an individual server, a cluster of computers, or a virtual machine, for example. The performance being monitored may be data throughput, CPU utilization, memory utilization, or any other measurable performance characteristic. Any given subset of three or more raw data points in the raw sequence may be equally spaced or unequally spaced in time.

To create the interval sequence 210 in some embodiments, a performance monitoring period is partitioned into equal interval periods. For example, a monitoring period of three days may be partitioned into interval periods of one hour each. Each interval period includes zero or more raw performance data points. The interval sequence is based on the intervals and the raw performance data. Each interval period is assigned a performance value based on the raw data point(s) within the interval period. For example, in one embodiment, an interval with no raw data is assigned null, an interval with one raw data point is assigned the value of that data point, and an interval with more than one raw data point is assigned the average of those data points. Notice that the absence of performance data, indicated by null, is not necessarily the same as the presence of zero-valued performance, which is indicated by zero in the interval sequence.

In some embodiments, the interval sequence has a corresponding presence sequence 220, in which interval sequence null corresponds to presence sequence zero and any non-null value in the interval sequence corresponds to a one in the presence sequence. Thus, each zero in the presence sequence indicates that no raw performance data was present with which to calculate the corresponding interval's performance data, and each one in the presence sequence indicates that raw performance data was present for the corresponding interval. Typically for NULLs in the interval sequence an interpolated value is determined as a function of neighboring non-Null data points in the interval sequence which can replace the NULL value. In some cases (mostly servers) one wants to estimate the performance profile of the target machine in case the collection tool cannot reach it intermittently.

In some embodiments, the presence sequence has a corresponding absence length sequence. In the presence sequence, one or more adjacent zeros is called a "run." For example, the presence sequence 1 1 0 1 0 0 1 0 0 0 0 1 1 1 includes a run with one zero, a run with two zeros and a run with four zeros. One way to derive 312 the absence length sequence is to map each one in the presence sequence to a zero in the absence length sequence and map each zero in the presence sequence to the length of the run in which that zero occurred. Thus, the presence sequence 1 1 0 1 0 0 1 0 0 0 0 1 1 1 would be mapped to the absence length sequence 0 0 1 0 2 2 0 4 4 4 4 0 0 0. Similarly, the presence sequence 1 1 0 0 0 1 0 1 0 0 0 0 1 1 would be mapped to the absence length sequence 0 0 3 3 3 0 1 0 4 4 4 4 0 0.

Some observations about time series interpolation

For a device D say one has a time interval t1 that does not have a value for a particular dimension (say CPU percent utilization) due to connection failure, machine being down, etc. Further, assume t1 is between 02-03-2011 12:10 pm to 02-03-2011 12:20 pm. One may then cause computation of the following:

The average of all time interval observations for the dimension within the hour i.e. between 12:00 PM and 1:00 PM, call this H.

The average of all time interval observations for the dimension within the day i.e. on 02-03-2011, call this D.

The average of all time interval observations collected across all intervals, call this A.

One may then get the first non-NULL value, in the order H, D, A, and assign that first encountered non-NULL value to be the value for time interval t1.

An Algorithm for computing an Absence Length Time Series

Step 1. After performance data has been collected over a period of time for a device, run an assessment that creates the corresponding time series by dividing the collection period into fixed length time intervals with one or more observed data points within each interval. The time intervals will be represented as an increasing consecutive number sequence (1, 2, 3, 4 etc).

Step 2. For each time interval with at least one direct observation, store a 0 in the corresponding absence length field at that time interval, otherwise store a non-zero value (1).

Step 3. Select all the data points that have initial absence length=1 ordered by time interval along with their corresponding row numbers (which will be an increasing consecutive number sequence).

Step 4. Subtract the row number for each data point selected in step 3 from its corresponding time interval and assign to a variable (called grouptag).

Step 5. Group the data points in step 4 by their grouptag.

Step 6. Select the count for each group. This is the actual absence length value for each data point that is a member of that group.

Step 7. Update the absence length values.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a technical process compensating for one or more gaps in workload monitoring data, the process comprising the steps of:

obtaining in a computer-readable memory workload monitoring data which includes raw performance data having values for at least one monitored machine, said raw performance data values being spaced apart at different points in time, said raw performance data denoted as a "raw sequence" herein, the raw sequence having at least one gap, namely, at least one pair of adjacent raw performance data values are spaced apart at a larger spacing than at least one other pair of adjacent raw performance data values and no raw performance data value is provided for at least one monitored machine within said larger spacing;

computationally with at least one processor operating with the memory transforming at least a portion of the raw sequence into interval performance data by partitioning a performance monitoring period into equal intervals and assigning null and non-null values to the intervals based on raw sequence values within the intervals, said interval performance data denoted as an "interval sequence" herein; and computationally with at least one processor operating with the memory converting at least a portion of the interval sequence into an absence length sequence which facilitates compensation for gap(s) in the workload monitoring data in that entries in the absence length sequence indicate a relative duration of null value periods in transformed raw performance data.

2. The computer-readable storage medium of claim 1, wherein the converting step comprises:

computationally with at least one processor operating with the memory generating an interval performance data presence sequence from the interval sequence, said generated sequence denoted as a "presence sequence" herein, each interval sequence null value corresponding to a zero in the presence sequence and each interval sequence non-null value corresponding to a one in the presence sequence; and computationally with at least one processor operating with the memory deriving the absence length sequence from the presence sequence.

3. The computer-readable storage medium of claim 2, wherein the process derives the absence length sequence from the presence sequence by using an algorithm with the following steps:
  Step 1: divide a collection period into fixed length time intervals with at least one observed data point within each interval, and number the time intervals;
  Step 2: for each time interval with at least one direct observation, store a zero in the corresponding absence length field at that time interval, otherwise store a non-zero value;
  Step 3: select all the data points that have initial absence length not zero, ordered by time interval along with their corresponding row numbers which are an increasing consecutive number sequence;
  Step 4: subtract the row number for each data point selected in step 3 from its corresponding time interval and assign to a variable, denoted a grouptag;
  Step 5: group the data points in step 4 by their grouptag;
  Step 6: select the count for each group as the absence length value for each data point that is a member of that group;
  Step 7: update the absence length values.

4. The computer-readable storage medium of claim 1, wherein the process further comprises replacing a null value in the interval sequence by a non-null value which is a function of neighboring non-null values.

5. The computer-readable storage medium of claim 1, wherein the interval sequence and the absence length sequence are stored in a table in a data store such that for each time interval there is a corresponding performance data point and absence length value.

6. The computer-readable storage medium of claim 1, wherein the process further comprises:
  getting a maximum absence length value, denoted here as MAX-A; and
  creating a transformed version of the original interval sequence for a target machine such that for every time interval where the corresponding absence length value is less than MAX-A the performance data point for that interval (whether interpolated or not) is used as-is and for any absence length value above MAX-A the value zero is selected as the performance data point, thereby treating the time interval as downtime for the machine.

7. The computer-readable storage medium of claim 1, wherein the process further comprises populating a locality sequence whose entries indicate whether one or more corresponding entries of the interval sequence rely on estimation rather than being directly observed values.

8. A technical process compensating for gaps in workload monitoring data, the process comprising the steps of:
  obtaining in a computer-readable memory workload monitoring data which includes raw performance data having values for at least one monitored machine, said raw performance data values being spaced apart at different points in time, said raw performance data denoted as a "raw sequence" herein, the raw sequence having at least one gap, namely, at least one pair of adjacent raw performance data values are spaced apart at a larger spacing than at least one other pair of adjacent raw performance data values and no raw performance data value is provided for at least one monitored machine within said larger spacing;
  computationally with at least one processor operating with the memory transforming at least a portion of the raw sequence into interval performance data by partitioning a performance monitoring period into equal intervals and assigning null and non-null values to the intervals based on raw sequence values within the intervals, said interval performance data denoted as an "interval sequence" herein;
  computationally with at least one processor operating with the memory converting at least a portion of the interval sequence into an absence length sequence which facilitates compensation for gap(s) in the workload monitoring data in that entries in the absence length sequence indicate a relative duration of null value periods in transformed raw performance data; and
  using the absence length sequence during at least one of the following steps: determining a capacity criterion for a set of information technology resources which includes the monitored machine, planning a consolidation of information technology resources which includes the monitored machine.

9. The process of claim 8, wherein the converting step comprises:
  computationally with at least one processor operating with the memory generating an interval performance data presence sequence from the interval sequence, said generated sequence denoted as a "presence sequence" herein, each interval sequence null value corresponding to a zero in the presence sequence and each interval sequence non-null value corresponding to a one in the presence sequence; and
  computationally with at least one processor operating with the memory deriving the absence length sequence from the presence sequence.

10. The process of claim 9, wherein the process derives the absence length sequence from the presence sequence by using an algorithm consistent with the following: let T denote an ordered set of time intervals of the form [1,N] where N is a maximum time interval value, let Tprime denote an ordered subset of T such that for any time interval Ti in Tprime the corresponding presence sequence value is 0, and for a monitored item select Tprime, generate an ordered set S such that any element Si in S satisfies the relation R->Si=Ti-indexof (Ti), with Ti permitted to have a many-to-one relationship with S, and generate a time-series absence sequence such that at any time interval Tk in the sequence when Tk is not in TPrime the absence sequence value is 0 and when Tk is in TPrime the absence sequence value is F(Sk) where F(Sk) is the number of time intervals in TPrime that evaluate to the value Sk in S, where Sk=Tk−IndexOf(Tk).

11. The process of claim 8, wherein the process further comprises replacing a null value in the interval sequence by a non-null value which is determined as a function of neighboring non-null values.

12. The process of claim 8, wherein the interval sequence and the absence length sequence are stored in a table in a data store such that for each time interval there is a corresponding performance data point and absence length value.

13. The process of claim 8, wherein the process further comprises:
  getting a maximum absence length value, denoted here as MAX-A; and
  creating a transformed version of the original interval sequence for a target machine such that for every time interval where the corresponding absence length value is less than MAX-A the performance data point for that interval (whether interpolated or not) is used as-is and for any absence length value above MAX-A the value zero is selected as the performance data point, thereby treating the time interval as downtime for the machine.

14. A monitoring computer system for monitoring at least one machine, the monitoring computer system comprising:

a logical processor;

a memory in operable communication with the logical processor;

raw performance time series data having values for at least one monitored machine, said raw performance time series data values being spaced apart at different points in time, said raw performance time series data denoted as a "raw sequence" herein, the raw sequence having at least one gap, namely, at least one pair of adjacent raw performance time series data values are spaced apart at a larger spacing than at least one other pair of adjacent raw performance time series data values and no raw performance time series data value is provided for at least one monitored machine within said larger spacing;

a correction module having correction logic which interacts with the processor and memory to correct at least one gap in the raw performance time series data for use in workload monitoring, in particular the correction logic transforming at least a portion of the raw sequence into an interval sequence by partitioning a performance monitoring period into equal intervals and assigning null and non-null values to the intervals based on raw sequence values within the intervals, and the correction logic converting at least a portion of the interval sequence into an absence length sequence, thus correcting at least one gap in the workload monitoring data by indicating a relative duration of null value periods in transformed raw performance data.

15. The monitoring computer system of claim 14, wherein the correction logic comprises software residing in the memory which upon execution by the processor generates an interval performance data presence sequence from the interval sequence, said generated sequence denoted as a "presence sequence" herein, each interval sequence null value corresponding to a zero in the presence sequence and each interval sequence non-null value corresponding to a one in the presence sequence, and derives the absence length sequence from the presence sequence.

16. The monitoring computer system of claim 14, wherein the raw performance time series data values represent at least one of the following:

desktop computer performance of monitored machines which are desktop computers, client computer performance of monitored machines which are clients in a client-server network, performance of monitored machines which are servers in a network.

17. The monitoring computer system of claim 14, wherein the correction logic comprises software residing in the memory which upon execution by the processor aggregates performance time series data values from multiple monitored machines.

18. The monitoring computer system of claim 14, wherein the correction logic comprises software residing in the memory which upon execution by the processor aggregates performance time series data values from multiple monitored machines while treating as zero interpolated values for data points whose absence length sequence value is greater than a predetermined positive maximum absence length value.

19. The monitoring computer system of claim 14, wherein the correction logic comprises a stored procedure residing in a database.

20. The monitoring computer system of claim 14, wherein the correction logic produces the absence length sequence without using a procedural language.

* * * * *